Patented Jan. 9, 1951

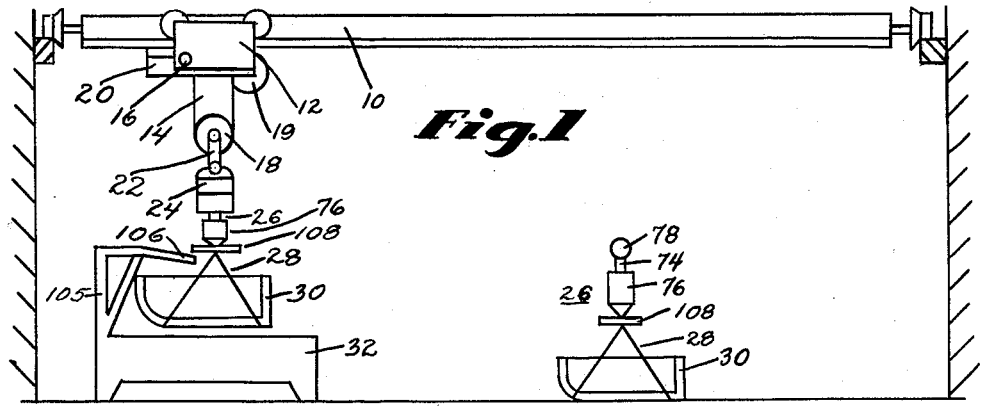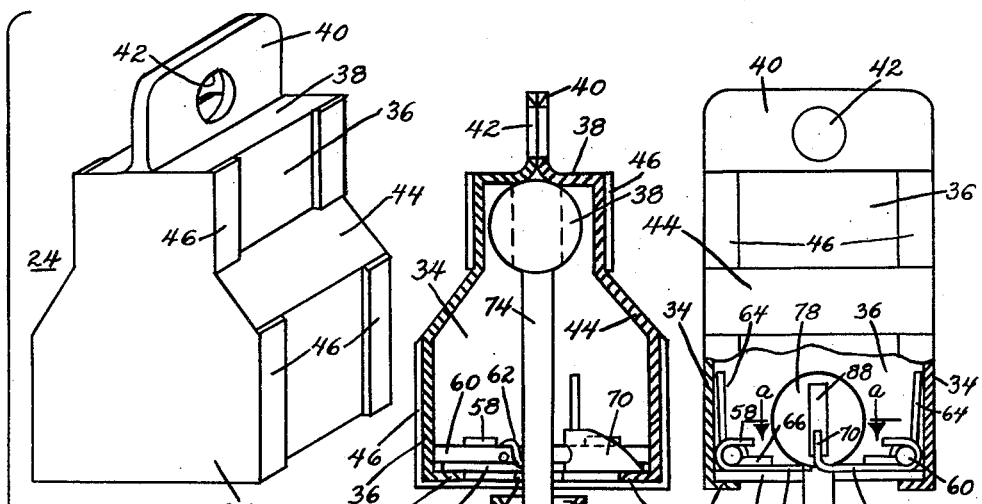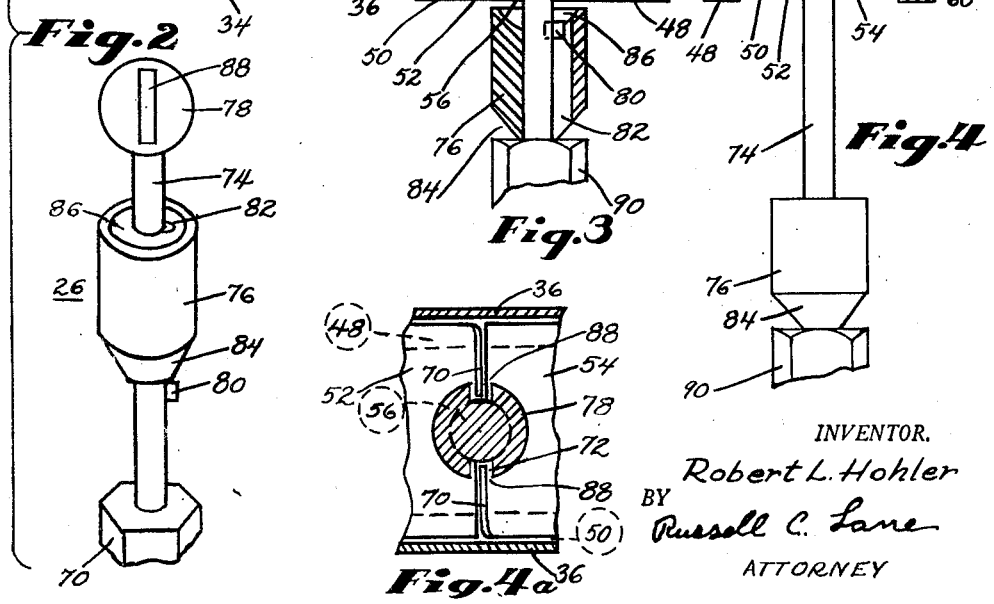

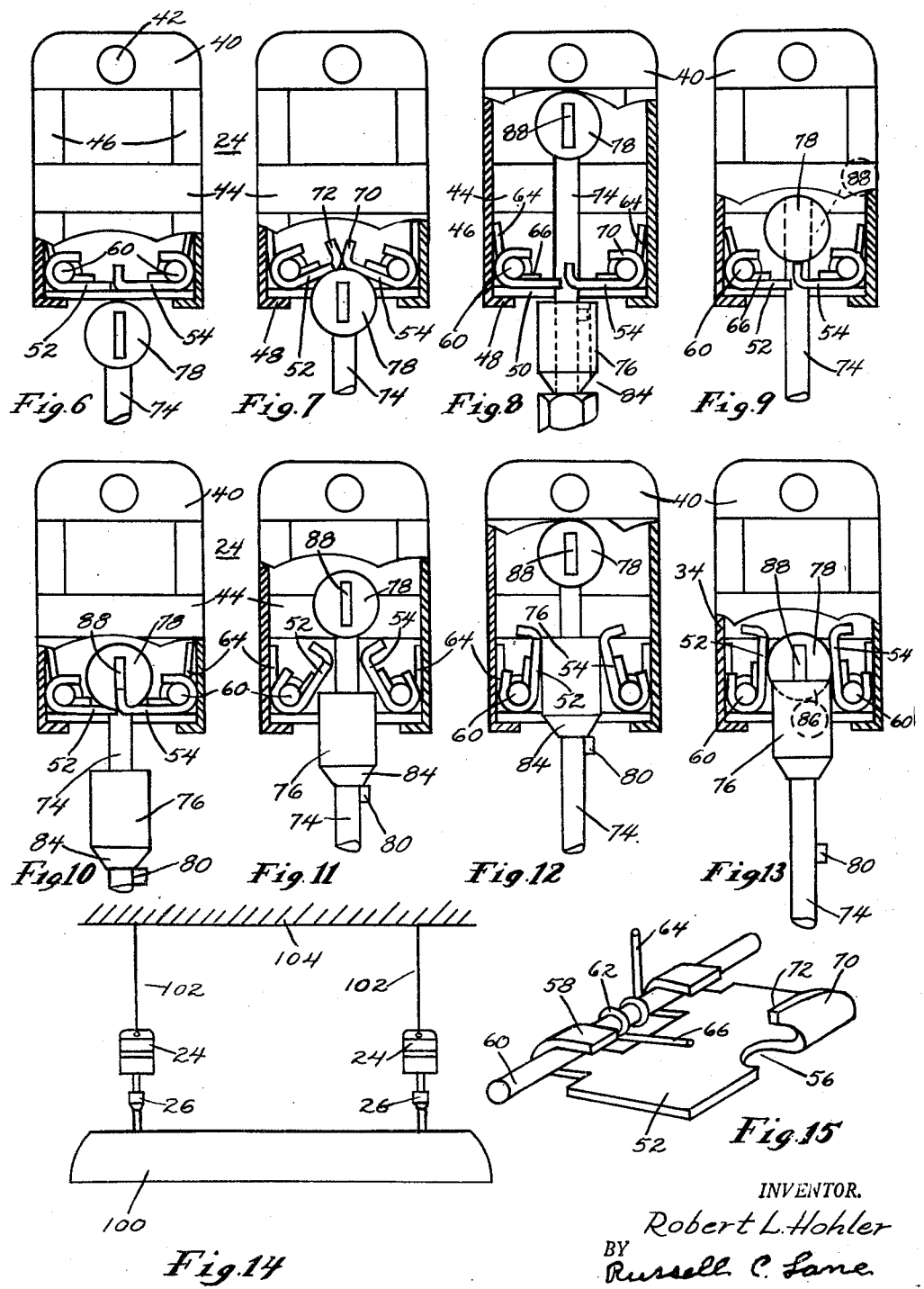

2,537,829

UNITED STATES PATENT OFFICE 2,537,829

RELEASABLE COUPLING

Robert Lee Hohler, Dayton, Ohio

Application February 14, 1947, Serial No. 728,660

11 Claims. (Cl. 294—83)

This invention relates to quickly separable coupling devices for hoists and the like including pendant supporting devices where it is desired to orient the load with respect to the hoist, or some other object.

An object of the invention is to provide a hoist or other coupling that is quickly connectible and disconnectible with an articulation for swivelling support in an oriented relation.

Another object of the invention is to provide a coupling unit that can be coupled and uncoupled by a simple linear movement between contributing parts.

A further object of the invention is to provide a coupling device for a load on a hoist that will permit successive raising and lowering of the load from a rest position without disconnecting the load from the hoist until it is determined to do so.

A further object of the invention is to provide a coupling device for a load on a hoist that will be separable into parts permitting one part or the other to be moved to a new location, and there be coupled with a duplicate related part.

Yet another object of the invention is to provide a coupling device made up of two separable parts, one of which is attached to the suspending device and the other, or multiples of them, may be attached to different loads, so that the loads may be successively picked up by the suspension device, upon a simple approaching movement for coupling relation.

In the art of travelling hoists it is desirable in many instances to move a load from one point to a distant point, and there set the load down for a rest prior to placing the load on a bench, machine or in a tank, in some particular relation. It is also sometimes desirable to leave the load at the new position while the hoist returns to the original location or some different location for another load to be transported to the same collecting or other location. For best efficiency in this practice it is desirable to leave part of the coupling device on the hoist and another part on the load for subsequent handling by the hoist. That is particularly true where the nature of the load is such that there is need or desire to clamp the coupling device to the work or load being handled. In some assembly work it is necessary to lower the load in a particular relation with respect to other structure with which the load is to be united. Such an instance would be the placing of automobile bodies on chassis for final joindure. The load, particularly at the pickup point may not be directly beneath the suspension device or properly aligned when the load is taken up, and it may be desirable to swing the load to one side somewhat when it is lifted or lowered. For other reasons it may be desirable to have a universal connection between the load and the suspension device while it is traveling from point to point.

In the art of pendent supports, such as chandeliers or elongated lamps of the fluorescent type, it is desirable to suspend them from the ceiling in alignment or parallelism with others. In some instances the elongated lamps are supported by a single rod or tube arranged at the geometrical center of the lamp, while in other instances it is desired to suspend the lamps by two rods or tubes, one at each end of the lamp housing. The lamps frequently have to be cleaned, and repaired, as well as have bulbs replaced. And that is facilitated by mounting the lamps with separable coupling units so that the lamp may be easily and quickly taken down, repaired and replaced. Much time is saved, and there is less breakage encountered if the lamp can be removed by simply raising it a little and then lowering it to the floor, and if it can be reinstalled simply by raising it into position, and then swung around to align with the other lamps of the installation.

The foregoing objects, advantages, and desires are accomplished by providing a coupling unit made up of two separable members, one of which is a socket member attachable to the hoist or suspension device, and which has spring pressed leaves or latches displaceable by inward pressure from the second member, which is in the form of a ball on the end of a load carrying rod that on passing beyond the latches of the socket member is so retained by the dropping of the latches. The load may be securely suspended from the hoist or other support, while notches in the ball of the second member are engaged by tongues or lugs on the leaves so that the load is caused to turn to a particular position on the support, and then is prevented from turning around at the socket, and is yet capable of swiveling suspension.

Further objects and advantages of the present invention will be apparent from the following description, reference being had to the accompanying drawings wherein a preferred embodiment of the present invention is clearly shown.

In the drawings:

Fig. 1 is an elevational view showing one type of use for the invention of applicant, in which the coupling unit is disposed between a traveling hoist and a load to be moved.

Fig. 2 is an exploded view of the coupling unit alone showing the relation of parts preparatory to effecting the coupled relation.

Fig. 3 is a view partly in section and partly in elevation showing the coupling device at one stage of the connecting movement.

Fig. 4 is an elevational view of the completed coupling with part of the receptacle element broken away to illustrate certain features of the invention.

Fig. 4a is a sectional view of the coupling as indicated by the line and arrows a—a of Fig. 4.

Figs. 6 to 9 are schematic views illustrating the steps in the uniting of the coupling elements, Fig. 6 showing the approach of the two elements, Fig. 7 showing the beginning of latch deflection, Fig. 8 showing the drop-back of the latches, and Fig. 9 showing the descent of the plunger.

Figs. 10 to 13 are schematic views illustrating the steps in disconnecting the elements, Fig. 10 showing the initial setting of the parts for tripping the latch, Fig. 11 showing the lifting of the latch members by the sleeve, Fig. 12 showing the latches fully lifted by the sleeve, and Fig. 13 showing the parts retracted ready to be separated.

Fig. 14 shows an alternative use for the coupling unit disclosed herein, in which a fluorescent lamp is suspended from the ceiling.

Fig. 15 is a perspective view of one of the latch members.

Referring particularly to the drawings, 10 indicates a track on which travels a hoist unit 12 having a cable or chain 14 attached thereto at 16 and trained around a sheave 18 to wind upon a drum 19 driven by a motor or other source of power 20. Fixed to a clevis 22 of the sheave 18 is a coupling receptacle or socket member 24 articulated to a separable stem 26 provided with grappling means 28 for attaching to a load 30. In Fig. 1, the hoist is illustrated as suspending the load over a bench or counter 32 as in the act of setting the load down thereon for rest, or as just having picked the load up from rest. From the illustrated position the load may be moved on the track to a new location where the load may be deposited temporarily or for a longer period of time. The load may be raised or lowered at any location by operating the power device 20 in the proper direction. When the load is set down to rest in any position the suspension device may be fully relaxed without the risk of uncoupling the load from the hoist. On the other hand if it is desired to detach the load from the hoist, it is practically an instantaneous act to do so when the coupling device embodies the features of the socket and stem of the instant disclosure. At the lower right of Fig. 1, a load with part of the coupling device attached is shown as resting on the floor ready for quick pick-up by the hoist.

Fig. 2 shows the disengaged coupling device in perspective with the socket member 24 and the stem member 26 just after separating. The socket member as shown comprises a sheet metal box-like structure having a pair of end walls 34 joined to a pair of side walls 36 and a top wall 38 to which is attached, or from which extends, a web or tongue 40 which is apertured at 42 to afford attachment to a suspending device, here such as the clevis 22. For a purpose later to be described, the side walls 36 are formed with cam surfaces at 44 that slant inward from near the bottom toward the center, and the end walls are shaped accordingly to cooperate with the top 38 and the sides to form a closed chamber except for the bottom face thereof. In fabricating the socket member 24, the edges of the end members 34 may be turned over at 46 to lay against the side walls 36 where they may be welded or brazed to aid in strengthening and securing the socket into an integral whole. Similarly, the bottom edges of the end walls are turned over at 48, while the bottom edges of the side walls 36 are turned over at 50 so as to provide a flange surrounding the open bottom of the receptacle.

Substantially closing the bottom of the socket 24 there are two hinged leaves 52 and 54 which have notches 56 at their proximate edges and hinging loops 58 on the opposite edges which encompass a hinge pin 60 secured to opposite walls 36 near the bottom edge of the end walls 34. A coil spring 62 is wrapped around each hinge pin 60 and has its opposite arms 64 and 66 disposed against the adjacent walls 34 of the socket and the leaf as shown in Fig. 4. The hinged leaves are thereby urged in closing relation over the open bottom of the socket, such that the free edges of the leaves meet in spaced relation at the middle of the bottom with the notches 56 being substantially centrally located with respect to the open bottom of the socket member. However, upon inward pressure the leaves yield sufficient to be deflected toward the walls 34, and then to snap back to the closing position again under the urge of springs 62 as soon as the inward pressure is removed. In addition, the leaves have the edge thereof on one side of the notch 56 turned up at right angles as indicated at 70, in Fig. 5, and terminate over the edge of the notch 56 in a blunt point or tongue 72. When the leaves are closed against the bottom of the socket member these points 72 extend toward each other but are yet spaced by an amount substantially equal to the diameter of the central opening formed by the notches 56, for a purpose later to be explained. The details of the hinged leaves are shown in the perspective view of Fig. 5.

Returning again to Figs. 2, 3 and 4, the stem member 26 comprises a rod 74 of circular section, or at least having a circular section at its upper end to receive a sleeve 76 and be secured to a ball-like or spherical head 78 against relative rotation. A pin or key 80 is set at right angles in the rod 74 and traverses a slot 82 joining the bore of the sleeve 76 and extending the length thereof. The lower end of the sleeve is chamfered off as indicated at 84, and the upper end of the sleeve 76 is countersunk at 86 somewhat is receptive conformity to the surface of the head 78. The head 78 is diametrically notched at 88 in substantial parallelism with the rod 74 so as to be generally receptive of the points 72 extending from the hinged leaves 52 or 54, as will presently appear and as shown in Fig. 4A. At the lower end of the rod 74 there is an adapter nut 90 that offers a means for attaching the stem unit to the load to be transported, or to the grappling device 28 attached to the load.

When it is desired to couple the load to the hoist, the socket member 24 is lowered or pushed down by hand over the ball-like head 78 of the stem unit, which pushes the hinged leaves 52, 54 upwardly and inwardly as in Fig. 7, allowing the head to pass to the interior of the socket member 24 engaging the cam surfaces 44 which cant the head and stem toward the center of the housing directly beneath the eye 42 as in Fig. 3. By that time, if the sleeve 76 is in the lowermost position on the rod 74, the spring urged leaves 52, 54 will have dropped down behind the head 78 with the notches encircling the rod 74 just beneath the head, locking the head against unintentional withdrawal from the socket as in Fig. 3, Fig. 8 and Fig. 9. Retraction of the stem unit in the socket engages the under side of the head with the notched edges of the hinged leaves for supporting the load when the hoist is operated to take up the slack in the cable or chain 14. The notches 88 of the head 78 having a definite relation to the load operate to orient the load with respect to the hoist mechanism, since the notches are engaged in the seating relation of the head on the leaves by the points 72 of the leaves, which demand that the load occupy a predetermined relation with respect to the socket. See Figs. 4, 4A and 10. After this coupling of load to hoist is made the load may be successively raised and set down to rest again without danger of disengaging the coupling.

When it is desired to uncouple the load from the hoist device, the sleeve 76 is raised on the rod 74 by sliding over the pin 80 until the lower chamfered end 84 of the sleeve is free of the pin 80 or above it, at which time the sleeve is rotated slightly on the rod 74 so that the pin 80 engages the lower end of the sleeve and holds it in the elevated position as shown in Fig. 9. Now, when the load is let down to rest and relaxed sufficiently the socket descends upon the stem member 26 so that the sleeve 76 pushes upwardly on the hinged leaves 52 and 54 causing them to yield inwardly and upwardly and permit the sleeve 76 to pass partway between them while the head enters the narrow part of the chamber in the socket member as in Figs. 11 and 12. The force of the springs 62 bearing on the hinged leaves are strong enough to hold the sleeve in the raised position of Fig. 12 so that the head and rod of the stem member may be lowered until the lower part of the ball now nests in the countersink 86, which presents such continuity of surface that withdrawal of the stem unit will allow the hinged leaves to slide off the end of the sleeve onto the head 78 and off the top of the head without catching behind the head in the latching relation.

In these schematic views of Figs. 6 to 13, Fig. 6 shows the approach of the two coupler elements in the process of connecting and locking, while Fig. 7 shows the start of deflection upward of the leaves 52 and 54 by the ball 78 of the stem member. In Fig. 8 the plunger or stem member has been inserted within the socket member sufficiently that the leaves 52 and 54 drop down beneath the ball to retain the stem assembly when lowered to the position of Fig. 9 where the ball or head 78 rides on the edges of the wings 70. An angular movement or partial rotation of the stem assembly will allow the points 72 to register with the notches 88 and thence take the seated relation shown in Figs. 4A and 10 where the ball 78 rests on the surface of the latch members. Fig. 11 shows the latch members 52 and 54 being raised by the sleeve 76 upon raising of the stem assembly which reaches the position shown in Fig. 12 where the latches 52 and 54 engage the cylindrical surface of the sleeve 76 firmly enough to retain the sleeve in the raised position even though the stem is retracted to the position shown in Fig. 13 where the ball 78 nests within the countersink 86 which allows the spring urged latches 52 and 54 to slide off the upper end of the sleeve 76 onto the ball and thence over its end as the stem assembly is withdrawn from the socket member to the relative position shown in Fig. 2.

The foregoing is in substance what happens upon making or breaking the union between the elements 24 and 26. It is therefore obvious that coupling of the load to the supporting device is accomplished by inserting the stem assembly 26 into the receptacle assembly 24, the unlocking sleeve of course having been released to the lowered position off the pin 80. When tension is placed upon the coupled members the load will be picked up and allowed to swivel universally. When it is desired to release the load, the sleeve is raised and secured above the pin 80, and then the load is lowered into position and the coupling device still further lowered to relax enough for entry of the stem assembly into the top of the socket. Immediate raising of the socket member will then separate the load from the supporting device. On the other hand if the load is raised by hand or otherwise with respect to the socket member, then the load may be immediately lowered to the uncoupled relation. Such might be the case shown in Fig. 14 where a lamp housing 100 is attached to a pair of stem members 26, one at each end, that are each coupled with a socket member 24 on the end of rods 102 supported from a ceiling 104. In that case setting the sleeve 76 above the pin 80 and then raising the lamp an inch or two with immediate lowering is sufficient to uncouple the lamp from its ceiling support. For remounting, it is only necessary to see that the sleeve 76 is in the lower position, then raise the lamp into position while steering the stem assembly into the socket assembly followed by a lowering of the lamp until the load is taken up by the suspension device.

The coupling device disclosed herein lends itself efficiently to automatic unloading as is shown in Fig. 1, where the bench 32 supports a bracket 104 providing a cam or guide piece 106 adapted to engage a flange or other part 108 on the sleeve 76 or stem 74 that will operate to raise the sleeve 76 when the load is moved relative to the guide piece. As shown in Fig. 1, when the suspended load is moved further to the left the guide piece 106 straddling the stem member beneath the part 108 will effect raising of the sleeve 76 so that when the coupling device is lowered the sleeve will lift the latch plates 52 and 54 as indicated in Fig. 12. A subsequent raising of the receptacle 24 will separate the load from the suspension device.

It is obvious of course that where the receptacle is remotely attached to a high ceiling and the real load supported thereby is at considerably lower elevation and is connected by a lengthy expanse of rod or cable between the socket 24 and the load, that the releasing sleeve 76 may take the form of a long tube a little shorter than the expanse between the load carrying nut 90 and the sleeve 76, or the distance between the sleeve and nut may be spanned by a tube of proper length, so that raising of the tube effects raising of the sleeve 76 sufficiently to release or displace the latch plates 52 and 54 when the load is elevated slightly.

While the embodiment of the present invention as herein disclosed, constitutes a preferred form, it is to be understood that other forms might be adopted, all coming within the scope of the claims which follow.

What is claimed is as follows:

1. In a suspension device, a quick detachable coupling for a load carried by said suspension device, comprising in combination, a socket member providing a pair of hinged latch plates normally closing an end opening in said socket member, a stem assembly providing a ball head and a sleeve movable thereon, said stem assembly being adapted to be inserted within the socket member by engagement and displacement of said latch plates which close around said stem assembly and engage the ball to prevent withdrawal of the stem assembly from the socket assembly when the sleeve is spaced from the ball.

2. The combination set forth in claim 1 wherein wing portions on the latch plates and notches in the ball head provide for orienting the load with respect to the suspension device.

3. In a suspension device, a quick detachable coupling for a load carried by said suspension device, comprising in combination, an open chamber member secured to a support, spring urged lock plates pivoted to the chamber member for closing the open end thereof and having cooperating notches adjacent the center of the opening, a stem assembly secured to the load adapted to be received by the lock plate notches, and having a head member adapted to deflect the lock plates from the outside of said chamber as the stem is inserted therein, means within the chamber for centering the stem assembly with respect to the opening of said chamber, said lock plates falling to a position behind the head and around the stem to retain the head against withdrawal from the chamber, and cooperating means between the lock plates and the head for orienting the load with respect to the chamber member.

4. In a pendent support for a load carrying hoist, a quick separable coupling comprising in combination, an open ended housing having spring urged lock plates normally closing the open end of the housing by meeting at the middle thereof, a ball headed plunger adapted to be inserted and locked within the housing and having a sleeve slidable on the plunger to and from the ball head, and also having a cross pin for selectively limiting the separation of sleeve and ball head, said ball of plunger being insertable in the housing past the lock plates to the opposite wall thereof which permits the lock plates to fall back and close the opening in the housing when the sleeve of the plunger is in unlimited spacing from the head, said plunger being separable from the housing only when the sleeve of the plunger is in limited spacing from the head and the plunger is then inserted against the wall of the housing opposite the opening and withdrawn, whereby the sleeve deflects the lock plates from behind the ball and holds them separated until the ball substantially withdraws from between said plates.

5. The combination set forth in claim 4 wherein the end of the sleeve adjacent the ball of the plunger is countersunk to receive a substantial portion of the plunger ball in withdrawing from the housing.

6. The combination set forth in claim 4 wherein the ball on the plunger provides a rounded surface engaging the lock plates in the locked position so as to provide for swinging movement of the load with respect to the said housing.

7. The combination set forth in claim 4 wherein the ball of the plunger has locating recesses and the lock plates have ears receivable by the recesses of the ball for permitting swinging movement between the housing and plunger but prevents angular movement of the load about the axis of the plunger.

8. The combination set forth in claim 4 wherein the housing member is comprised of sheet metal with edges turned in at the open end, and the lock plates are pivoted at opposite sides of the openings inside of the turned in edges and engage the edges thereof to transmit all of the load to the housing.

9. In a traveling hoist adapted to pick up a load at one station and move the load to and deposit it as a second station before returning to the first or other station for a second load, a quick separable coupling unit comprising in combination, a receptacle secured to the hoist, and a stem member secured to the load units adapted to be secured to the receptacle, said receptacle including an open ended chamber having spring urged displaceable latch plates normally closing the open end of the chamber, said stem member providing a ball head adapted, upon relative approach movement between the stem and receptacle, to displace the latch plates and enter the chamber far enough for the latch plates to drop behind the ball head to secure the coupling of the load to the hoist, a movable sleeve on the stem shiftable toward and away from the ball head, and means for holding the sleeve in relatively close proximity to the ball head so that approach movement of the coupled receptacle and stem member will displace the latch plates to permit withdrawal of the ball head from behind the latch plate upon relative separable movement between the stem and receptacle.

10. The combination set forth in claim 9, wherein cooperating notch and tongue provisions on the ball head and latch plates operate to prevent relative rotation of the load and hoist on a vertical axis through the coupling unit.

11. The combination set forth in claim 9, wherein means are provided at the unload station for moving the sleeve on the stem to a position relatively adjacent the ball head so that the descending movement of the receptacle will first rest the load on a support, then slacken the connection between the hoist and load and effect displacement of the latch plates by the sleeve, and so that subsequent raising movement of the receptacle will slide the sleeve into contact with the ball head to permit the latch plates to pass upwardly overly the ball head of the stem and free the load from the hoist.

ROBERT LEE HOHLER.

REFERENCES CITED

The following references are of record in the file of this patent:

UNITED STATES PATENTS

| Number | Name | Date |
|---|---|---|
| 732,923 | Coffin | July 7, 1903 |
| 1,838,400 | Hornbeck | Dec. 29, 1931 |
| 2,336,748 | Pearl | Dec. 14, 1943 |